United States Patent
Ramamurthy et al.

(10) Patent No.: US 9,544,344 B2
(45) Date of Patent: Jan. 10, 2017

(54) METHOD AND APPARATUS FOR STREAMING MEDIA CONTENT TO CLIENT DEVICES

(71) Applicant: Google Technology Holdings LLC, Mountain View, CA (US)

(72) Inventors: Arjun Ramamurthy, San Diego, CA (US); Ajay K. Luthra, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 710 days.

(21) Appl. No.: 13/681,835

(22) Filed: Nov. 20, 2012

(65) Prior Publication Data
US 2014/0143440 A1 May 22, 2014

(51) Int. Cl.
*H04L 29/06* (2006.01)
*H04N 21/2343* (2011.01)
(Continued)

(52) U.S. Cl.
CPC .......... *H04L 65/60* (2013.01); *H04N 21/2393* (2013.01); *H04N 21/23439* (2013.01);
(Continued)

(58) Field of Classification Search
CPC .......... H04L 65/60; H04L 47/10; H04L 47/11; H04L 47/122; H04L 67/106; H04L 65/4084; G06F 15/16; H04N 21/23473; H04N 21/63345; H04N 19/164; H04N 21/64322; H04N 21/2349; H04N 21/2393; H04N 21/4384; H04N 21/6581; H04N 21/2402; H04H 60/32
See application file for complete search history.

(56) References Cited

U.S. PATENT DOCUMENTS 6,249,530 B1 * 6/2001 Blanco .................... H04L 47/10
 370/231
7,231,213 B2 6/2007 Dorsey et al.
(Continued)

FOREIGN PATENT DOCUMENTS

WO 0245456 A1 6/2002
WO 2004097660 A1 11/2004
(Continued)

OTHER PUBLICATIONS

Negrue et al., "Adaptive Audio-Video Streaming Solution over IP Mobile Environments", Apr. 2006, WCNC Wireless Communications and Network Conference.*
(Continued)

*Primary Examiner* — Vivek Srivastava
*Assistant Examiner* — Todd L Barker
(74) *Attorney, Agent, or Firm* — Fenwick & West LLP (57) ABSTRACT

A method and apparatus for providing streamed media to client devices includes providing, for a client device, a variant playlist file that identifies a plurality of variant streams each corresponding to a different encoding of the same presentation but each presenting the same content having the same duration; and receiving, from the client device, a first request to provide a first set of identifiers that directs the first client device to a first set of media segments from a first variant stream of the plurality of variant streams in the variant playlist file, wherein the first set of media segments corresponds to a first encoding. The method further includes, responsive to the first request, providing a second set of identifiers that directs the client device to a second set of media segments, which corresponds to a second encoding, to use in downloading a first portion of the content.

15 Claims, 6 Drawing Sheets

(51) Int. Cl.
*H04N 21/239* (2011.01)
*H04N 21/24* (2011.01)
*H04N 21/438* (2011.01)
*H04N 21/658* (2011.01)

(52) U.S. Cl.
CPC ..... *H04N 21/2402* (2013.01); *H04N 21/4384* (2013.01); *H04N 21/6581* (2013.01)

(56) References Cited

U.S. PATENT DOCUMENTS

| | | | |
|---|---|---|---|
| 7,562,375 B2 | 7/2009 | Barrett et al. | |
| 7,779,146 B2* | 8/2010 | Deshpande | 709/233 |
| 7,904,581 B2 | 3/2011 | Sherer et al. | |
| 8,200,747 B2* | 6/2012 | Apostolopoulos et al. | 709/203 |
| 8,205,004 B1* | 6/2012 | Kaufman et al. | 709/231 |
| 8,259,861 B2* | 9/2012 | Kuhtz | H04H 20/42 375/334 |
| 8,417,828 B2* | 4/2013 | Ma et al. | 709/231 |
| 8,510,555 B2* | 8/2013 | Tam | H04N 21/23473 375/240.07 |
| 8,521,899 B2* | 8/2013 | Narula | H04L 65/4092 709/231 |
| 8,918,535 B2* | 12/2014 | Ma et al. | 709/232 |
| 8,996,719 B2* | 3/2015 | Condon | H04N 21/23439 709/203 |
| 2006/0117359 A1 | 6/2006 | Baldwin et al. | |
| 2007/0236599 A1 | 10/2007 | Van Beek | |
| 2008/0109865 A1 | 5/2008 | Su et al. | |
| 2010/0128604 A1* | 5/2010 | Appleby | H04N 21/23106 370/230 |
| 2010/0235472 A1* | 9/2010 | Sood | H04L 65/4092 709/219 |
| 2010/0299552 A1* | 11/2010 | Schlack | H04L 47/10 714/4.1 |
| 2011/0183662 A1 | 7/2011 | Lee et al. | |
| 2011/0314130 A1 | 12/2011 | Strasman | |
| 2012/0005368 A1 | 1/2012 | Knittle | |
| 2012/0110628 A1 | 5/2012 | Candelore | |
| 2012/0311094 A1* | 12/2012 | Biderman | H04N 5/783 709/219 |
| 2012/0327799 A1* | 12/2012 | Sandlund et al. | 370/252 |
| 2014/0006450 A1* | 1/2014 | Ghaskadvi | 707/783 |

FOREIGN PATENT DOCUMENTS

| | | | |
|---|---|---|---|
| WO | 2010060106 A1 | 5/2010 | |
| WO | 2010135333 A1 | 11/2010 | |

OTHER PUBLICATIONS

De Cicco et al., "Feedback Control for Adaptive Live Video Streaming", Feb. 2011, NMSys'11, Proceedings of the Second Annual ACM Conference on Multimedia Systems.*

Pantos et al., "HTTP Live Streaming" Internet Download, http://tools.ietf.org/html/draft-pantos-http-live-streaming-06, Mar. 31, 2011, 48 pages.

"Telco IPTV View: Jungo Fast Channel Change", Internet Download, http://telcotv-view.blogspot.com/2008/10/jungo-fast-channel-change.html, Oct. 16, 2008, 1 page.

Azgin et al., "A Unified Fast Channel Change Framework for IPTV Networks" IEEE Consumer Communications and Networking Conference—Work in Progress, 8th Annual; Las Vegas, NV; Jan. 9-12, 2011, pp. 695-696.

European Patent Office, "Extended Search Report" for European Application No. 12290115.0 dated Jul. 26, 2012, 15 pages.

3GPP TS 36.331 v10.4.0 (Dec. 2011), 3rd Generation Partnership Project; Technical Specification Group Radio Access Network; Evolved Universal Terrestrial Radio Access (E-UTRA); Radio Resource Control (RRC); Protocol specification (Release 10) 296 pages.

3GPP TS 25.331 v11.0.0 (Dec. 2011), 3rd Generation Partnership Project; Technical Specification Group Radio Access Network; Radio Resource Control (RRC); Protocol specification (Release 11) 1909 pages.

3GPP TSG Ran WG2 #64, R2-086960 "Periodic Updates in Connected State" Vodafone; Prague, Czech Republic; Nov. 10-14, 2008; 6 pages.

3GPP TSG Ran WG2 #63bis, R2-085702 "Periodic Updates in Connected State" Vodafone; Prague, Czech Republic; Sep. 29-Oct. 3, 2008; 10 pages.

Patent Cooperation Treaty, "PCT Search Report and Written Opinion of the International Searching Authority" for International Application No. PCT/US2013/031147 dated Apr. 24, 2013, 18 pages.

Patent Cooperation Treaty, International Search Report and Written Opinion of the International Searching Authority for International Application No. PCT/US2013/066999, Feb. 20, 2014, 9 pages.

\* cited by examiner

METHOD AND APPARATUS FOR STREAMING MEDIA CONTENT TO CLIENT DEVICES

FIELD OF THE DISCLOSURE

The present disclosure relates generally to streaming media content to client devices and more particularly to enabling faster playback start-up times for downloaded media content.

BACKGROUND

Since 1992, when the first image was posted on the Internet, methods for delivering media across computer networks have been developed which continue to evolve. Today, video is one of the dominant forms of downloaded media due to greater network bandwidths coupled with a wide variety of available multimedia-capable devices. For instance, YouTube reports that as of January, 2012, 4 billion videos per day were viewed on its site alone—a number which continues to grow.

A prevalent standard used to support video downloads is Hypertext Transfer Protocol (HTTP) Live Streaming (HLS), which allows playback to begin on a client device before a video is received in its entirety. HLS, as described in Internet Engineering Task Force (IETF) Internet Draft Document *HTTP Live Streaming* (Pantos & May; ver. 09; Sep. 22, 2012-Mar. 26, 2013, and all subsequent versions (collectively referred to herein as HLS, the HLS draft specification, or the HLS standard)), is a client-driven protocol that divides a video presentation into discreet chunks, which can be downloaded separately and played in sequential order. While this approach eliminates some of the wait time associated with watching a video, a client device still experiences a start-up delay when changing the channel or otherwise beginning a new video stream.

The problem of start-up delay stems, at least in part, from the use of protocols that control the client device and how it stores content within its buffer to support uninterrupted playback. Current engineering efforts focus on adapting hardware and/or software elements within client devices to arrive at possible solutions. Such approaches, however, are insufficient.

Accordingly, there exists a need for a novel method and apparatus for streaming media content to client devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for increasing efficiency when streaming multimedia content to electronic devices. This is accomplished by providing an HLS-capable server with functionality that allows it some control over an otherwise client-driven streaming process. In one embodiment, the server redirects a client device requesting a variant stream to an alternate stream with a lower encoded bitrate to reduce the device's start-up time. The server can also reduce start-up time for a client device by providing it with shorter-duration media segment files until it begins playback. In another embodiment, the server temporarily lowers the network bandwidth and/or the encoded bitrate provided to one or more established client devices to free up additional network bandwidth to allow a new client device to buffer media content more quickly. By shortening the start-up time associated with the playback of streamed content, the user of an electronic device is provided with a more-enjoyable multimedia experience.

In accordance with the teachings herein, a method, performed by a server, for streaming media content to client devices comprises providing, for a first client device, a variant playlist file that identifies a plurality of variant streams each corresponding to a different encoding of the same presentation but each presenting the same content having the same duration. The method additionally comprises: receiving, from the first client device, a first request to provide a first set of identifiers that directs the first client device to a first set of media segments from a first variant stream of the plurality of variant streams in the variant playlist file, wherein the first set of media segments corresponds to a first encoding; and, responsive to the first request, providing a second set of identifiers that directs the first client device to a second set of media segments, which corresponds to a second encoding, to use in downloading a first portion of the content.

Further in accordance with the teachings herein is an apparatus for providing streamed media to client devices that comprises an interface configured to receive a media stream, and a server configured to: generate a plurality variant streams from the media stream, wherein each variant stream from the plurality of variant streams corresponds to a different encoded bitrate of the same presentation but each presenting the same content having the same duration; and provide a variant playlist that identifies a subset of the plurality of variant streams. The server is further configured to: receive, from a first client device, a first request for a first set of identifiers that directs the first client device to a first set of media segments from a first variant stream of the subset of the plurality of variant streams, wherein the first set of media segments corresponds to a first encoded bitrate; and determine, in response to the first request, a second set of identifiers that directs the first client device to a second set of media segments from a second variant stream from the plurality of variant streams to use in downloading a first portion of the content, wherein the second variant stream corresponds to a second encoded bitrate that is lower than the first encoded bitrate.

Also in accordance with the teachings herein, is a non-transient computer-readable storage element having a computer readable code stored thereon for programming a computer to perform a method for providing streamed media to client devices. The method comprises providing, for a first client device, a variant playlist file that identifies a plurality of variant streams each corresponding to a different encoded bitrate of the same presentation but each presenting the same content having the same duration. The method additionally comprises: receiving, from the first client device, a first request to provide a first set of identifiers that directs the first client device to a first set of media segments from a first variant stream of the plurality of variant streams in the variant playlist file, wherein the first set of media segments corresponds to a first encoded bitrate; and, responsive to the first request, providing a second set of identifiers that directs the first client device to a second set of media segments from a second variant stream of the plurality of variant streams in the variant playlist file, wherein the second set of media segments corresponds to a second encoded bitrate that is lower than the first encoded bitrate.

Figure 1:
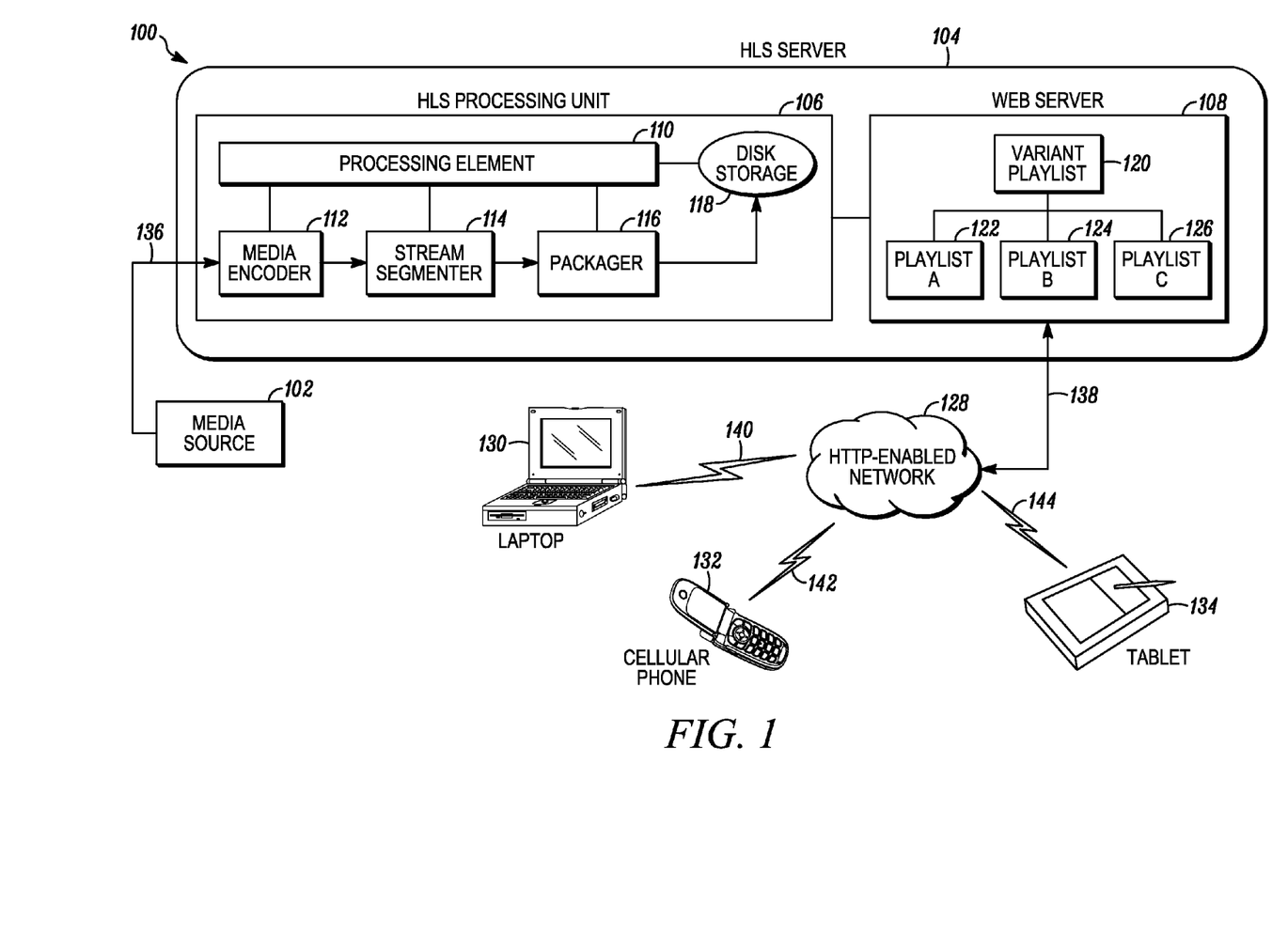
FIG. 1 is a block diagram of network infrastructure configured to stream multimedia content in accordance with some embodiments of the present teachings.

Referring now to the drawings, and in particular FIG. 1, a system comprising network infrastructure implementing embodiments in accordance with the present teachings is indicated generally at 100. Shown at 100 is a media source 102, an HLS server 104 (that includes an HLS processing unit 106 and a web server 108), an HTTP-enabled network 128, links or connections 136-144, and three client devices, namely, a laptop 130, a cellular phone 132, and a tablet 134. The HLS processing unit 106, in turn, comprises a processing element 110, and disk storage 118. Additionally, the HLS processing unit 106 is shown to comprise a media encoder 112, a stream segmenter 114, and a packager 116, which, in an embodiment, are logical indications of functionality performed by the HLS processing unit 106. Only a limited number of system elements 102-118, 128-134 are shown at 100 for ease of illustration, but additional such elements may be included in the system. Moreover, other elements needed for a commercial embodiment of the system 100 are omitted from the drawing for clarity in describing the enclosed embodiments.

We now turn to a brief description of the elements within the system 100. In general, the HLS server 104, which is configured to operate in compliance with the HLS draft specification, and a plurality of its constituent elements are adapted with functionality in accordance with embodiments of the present disclosure as described in detail below with respect to the remaining figures. The client devices 130-134, media source 102, and infrastructure elements within the network 128 are also configured to perform their, respective, functionality. "Adapted," "operative" or "configured" as used herein means that the indicated elements are implemented using one or more memory devices, interfaces, and/or processing devices that are operatively coupled. The memory devices, interfaces, and/or processing devices, when programmed, form the means for these system elements to implement their desired functionality.

The interfaces (not shown but used to establish and maintain the illustrated connections 136-144 between the system elements) are used for passing signaling, also referred to herein as messaging (e.g., messages, packets, datagrams, frames, superframes, and the like), containing control information, voice, or non-voice media between the elements of the system 100. The implementation of the interface in any particular element depends on the particular type of network, i.e., wired and/or wireless, to which the element is connected. For example, the client devices 130-134 contain wireless interfaces (that are used to establish wireless connections) to attach to the HTTP-enabled network 128, and the HLS server 104 can contain wired interfaces (that are used to establish wired connections) to connect to infrastructure devices contained in the network 128. Examples of wired interfaces include Ethernet, T1, USB interfaces, etc. Examples of wireless interfaces include wireless protocols and associated hardware that support technologies including, but not limited to, Long Term Evolution (LTE), CDMA, GSM, Wi-Fi, etc.

Where the system 100 supports wireless communications, the interfaces comprise components including processing, modulating, and transceiver components that are operable in accordance with any one or more standard or proprietary wireless interfaces, wherein some of the functionality of the processing, modulating, and transceiver elements can be performed by means of one or more processing devices through programmed logic such as software applications or firmware stored on the memory device of the system element or through hardware. In a particular embodiment, the connections 136-144 maintained by the interfaces are internet protocol (IP) connections.

Processing devices (e.g., the HLS processing unit 106 and processing element 110) utilized by the elements of system 100 may be partially implemented in hardware and, thereby, programmed with software or firmware logic or code for performing their functionality as described, for example, by reference to FIGS. 2-5; and/or the processing devices may be completely implemented in hardware, for example, as a state machine or ASIC (application specific integrated circuit). The memory (e.g., disk storage 118) implemented by these system elements can include short-term and/or long-term storage of various information needed for the functioning of the respective elements. The memory may further store software or firmware for programming the processing device with the logic or code needed to perform its functionality.

Turning back again to the detailed description of the system 100 elements, the HLS server 104, interchangeably referred to herein as "the server," manages the methods described throughout these teachings for streaming media content to client devices and optimizing network performance. To accomplish this, the server 104 comprises a processing element 110, interchangeably referred to herein as a "computer," which can be programmed, for example, via a non-transient computer-readable storage element having computer-readable code stored thereon.

Interfaced to the HLS server 104 is the media source 102, which streams media content over connection 136 to the media encoder 112 within the HLS processing unit 106. In alternate embodiments, the media encoder 112 can be located outside of the HLS server 104. The media source 102 streams media in a particular format, which is either compressed (e.g., lossy) or uncompressed (e.g., lossless). Streamed media is media that is continuously received at and presented by a client device while it is being delivered (i.e., streamed) by a streaming media source. If the media content is compressed, the media encoder 112 transcodes the media from one compressed format into another. Where the media content is uncompressed, the media encoder 112 encodes the media stream. In a particular embodiment, independent of the format of the media stream received from the media source 102, output streams from the media encoder 112 are encoded using MPEG-4 media compression (e.g., MPEG-4 part 10 Advanced Video Coding (AVC)/ H.264 video compression with Advanced Audio Coding (AAC) audio compression) and encapsulated using an MPEG-2 transport-stream container format. Such an embodiment, however, is not limiting, and other forms of encoding and/or encapsulation may be used to implement the teachings described herein.

In one embodiment, the media encoder 112 transcodes or encodes a plurality of variant streams from the media stream it receives, wherein each variant stream corresponds to a different encoded bitrate and/or resolution. The encoded bitrate, as used herein, refers to the information density of an encoded media stream or file, specifically, the number of bits per unit of playback time. Typically, higher encoded bitrates correspond to increased playback quality, and also to larger files that require more bandwidth and/or time to download. The encoded bitrate for a media stream can be reduced, for example, by encoding fewer frames per second, decreasing the frame size, reducing the number of colors, encoding for monaural rather than multichannel audio, or using more efficient compression (which can require greater client-side processing capability for decoding).

The term "encoding" as used herein refers to how the data within a media file or stream is formatted. Two variant streams presenting the same content have different encodings where they have different encoded bitrates. Two variant streams presenting the same content can also correspond to different encodings where their encoded bitrates are the same. This might be the case, for example, where one variant stream is formatted for higher-resolution frames presented at a lower rate while the other is formatted for lower-resolution frames presented at a higher rate, respectively.

For various embodiments, the HLS server 104, client devices 130-134, and media source 102 all control to varying degrees the encoded bitrates of the variant streams produced by the media encoder 112. In one embodiment, for example, when standard-definition media content is received from the media source 102, the media encoder 112 restricts encoded bitrates to 2 megabits per second (Mbps) and lower. When high-definition media content is received from the media source 102, the media encoder 112 can produce variant streams with encoded bitrates of 4 Mbps and higher. In another embodiment, the processing element 110 directs the media encoder 112 to produce variant streams with encoded bitrates that allow the HLS server 104 to perform its functionality as described herein. In further embodiments, the media encoder 112 within the HLS server 104 produces variant streams with particular encoded bitrates in response to requests received from the client devices 130-134 or in response to parameters introduced by an administrator or programmer.

The stream segmenter 114 receives the plurality of variant MPEG-2 transport streams output by the media encoder 112 and subdivides or partitions each variant MPEG-2 transport stream into a sequence of media segment files of smaller duration (typically between 1 to 10 seconds, although durations that fall outside of this range are also possible). Media segment files, sometimes referred to in the art as "chunks," are also referred to herein as "media segments." The term "duration," as used herein, is defined as the playback time of a media segment file or stream portion played by a client device at normal speed (i.e., an intended playback speed of the presentation being streamed). The media segment files are then passed from the stream segmenter 114 to the packager 116, which prepares them for a specific delivery protocol. In a particular embodiment, for example, the delivery protocol supports HTTP GET requests under the HTTP pull model.

The system 100 stores the media segment files from the packager 116 within the disk storage 118 for the web server 108 to access and distribute. Disk storage 118 is a storage device comprising flash memory, solid state devices or one or more rotating platters having a surface layer on which data is digitally recorded (e.g., an array of independent magnetic hard drives). As shown in FIG. 1, disk storage 118 is located within the HLS processing unit 106 of the HLS server 104. Alternate embodiments, however, allow for the storage of media segment files outside of the HLS processing unit 106. Possible locations include within the web server 108, internal to the HLS server 104 but external to the web server 108, or external to the HLS server 104. Additionally, substitute devices can be used for the storage of media segment files, such as optical drives and other compatible technologies.

The web server 108 delivers (i.e., serves up) the media segment files stored at 118 to the client devices 130-134. The functionality of the web server 108 can be implemented as hardware (i.e., a physical server), software (i.e., a computer program), or a combination of the two. Further, a physical web server can be located either within (as shown) or external to the HLS server 104. As indicated at 120, the web server 108 publishes (i.e., hosts) a variant playlist file (also referred to herein as a variant playlist) by making it accessible to one or more client devices. The variant playlist file 120 serves as a directory that contains entries pointing to individual playlists 122-126 (also referred to herein as playlist files) which, in turn, contain entries that point to individual media segment files from the variant streams. A "pointer," as used herein, is a means by which the web server 108 is directed to a resource being pointed to. An example of a pointer is a uniform resource locater (URL). The web server 108 can map the path component of the URL into a local file system resource for static requests, or a program name for dynamic requests. The first portion of the URL comprises a domain name which is mapped to the IP address of the web server 108 by a domain name server. The remainder of the URL (the path component) comprises a path relative to the root directory of the web server 108 which by a user agent for the client device translates into an HTTP GET request.

The system 100 associates each individual playlist published by the web server 108 with a variant stream having a specific encoded bitrate. Playlist A 122, for example, might contain URLs that point to media segment files from a variant stream encoded in high-definition television (HDTV) format (i.e., 1280×720 pixels) at 60 frames per second, whereas the URLs in playlist B 124 might point to media segment files from a variant stream encoded in Super Video Graphics Array (SVGA) format (i.e., 800×600 pixels) at 30 frames per second. Playlist and variant playlist files can also contain information tags, which in some embodiments comprise comment lines within the files that convey information about the variant streams and media segment files being described. In other embodiments, metadata is embedded within the media segment files using a data container such as ID3 (as described by informal standard documents: id3v2.4.0-structure.txt and id3v2.4.0-frames.txt (M. Nilsson; Nov. 1, 2000, and all subsequent versions)), for example. Metadata containers allow information about a file to be stored in the file itself.

In addition to live streaming, the teachings presented herein can also be applied to video on demand (VOD). For VOD, a full set of media segment files exists for a media presentation (i.e., video) at the time a client device makes a request (i.e., demand) for the presentation. This full set of media segments represents a complete encoding of the entire presentation, which can be identified in a playlist used to stream the individual segments files to the client device. For live streaming, by contrast, the HLS server 104 receives the client device's request for a media presentation while it is still in the process of receiving the presentation and creating media segment files for it. At any given time during the live streaming process, media segment files are only available for a portion of the media presentation that has already been streamed to the HLS server 104. Playlist files for presentations being streamed live contain only entries pointing to available media segments. In a particular embodiment, consistent with the HLS draft specification, a playlist file for a live stream contains entries for a fixed number of media segments (e.g., 3 media segments). As an entry for each new media segment is created by the HLS server is added to the playlist, an entry for an older media segment is removed. In this way, the playlist file represents a "sliding window" that "frames" a fixed number of "current" media segment files in real time as the playlist tracks the live media presentation being streamed.

The HTTP-enabled network shown at 128 communicatively couples the client devices 130-134 to the HLS server 104. It represents a computer network that uses an HTTP protocol stack to govern the exchange of information. In a particular embodiment, the HTTP-enabled network 128 uses HTTP, Transmission Control Protocol (TCP), and IP protocols for its application, transport, and internet layers, respectively (e.g., the Internet). The HLS server 104 sends and receives data and messages to and from the client devices 130-134 using connection 138 which relays network packets (i.e., datagrams). The connection shown at 136 allows the HLS server 104 to pass and receive data and control signals to and from the media source 102.

The laptop 130, cellular phone 132, and tablet 134 are all client devices that support the playback of audio- and/or video-based media files. Client devices are electronic devices with storage capability that can interact with the HLS server 104 to download and buffer media content. In addition to these particular devices, the teachings herein also apply to portable media players (PMPs), game consoles, and other electronic devices that can download and play media files. In an embodiment, each type of client device has a different set of capabilities that defines its playback characteristics, such as, but not limited to, screen size, buffer capacity, processing (e.g., decoding) ability, and minimum number of segments stored in its buffer to start playback.

Figure 2:
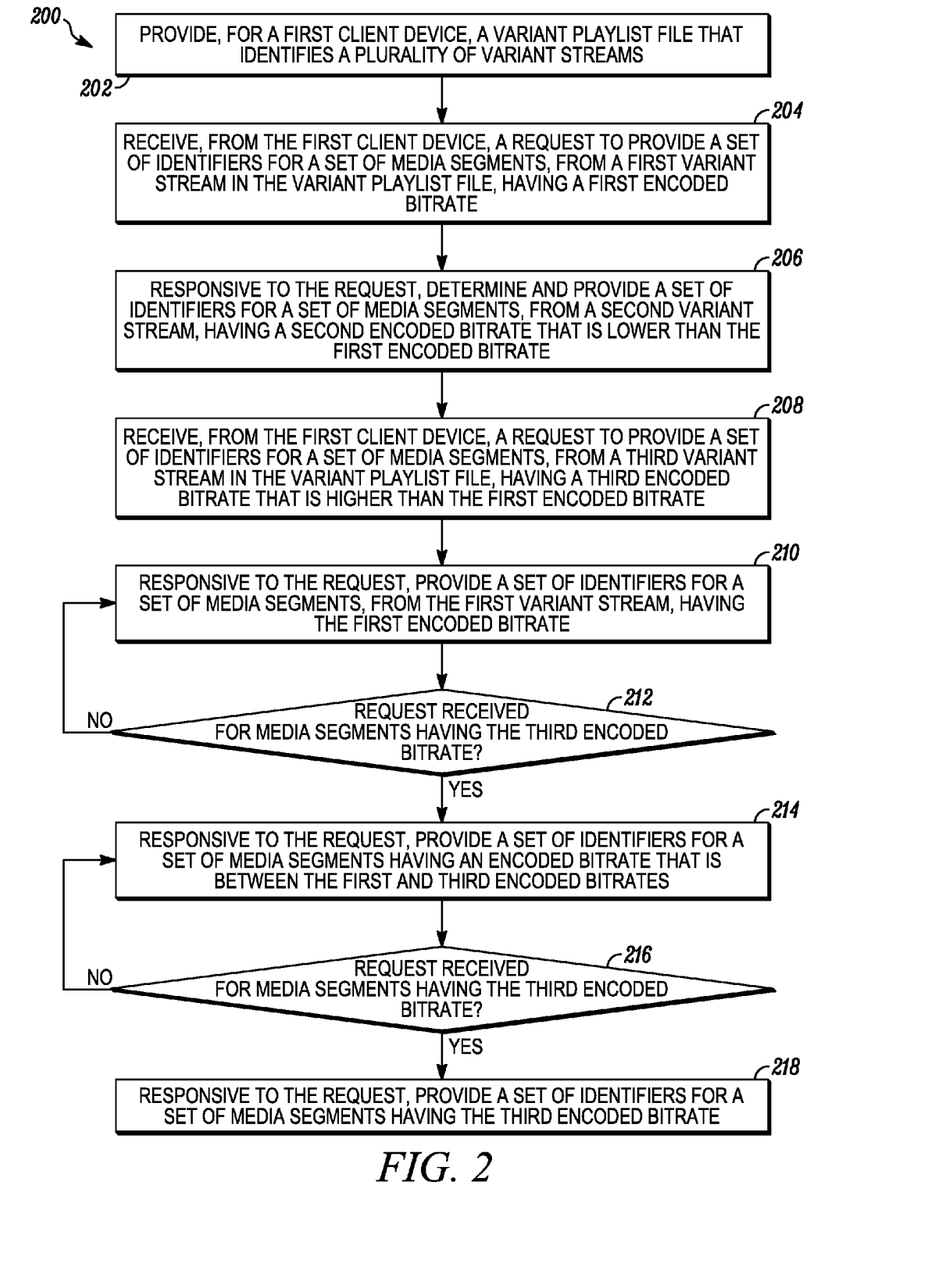
FIG. 2 is a logical flowchart illustrating a method for streaming multimedia content in accordance with some embodiments of the present teachings.
Figure 3A:
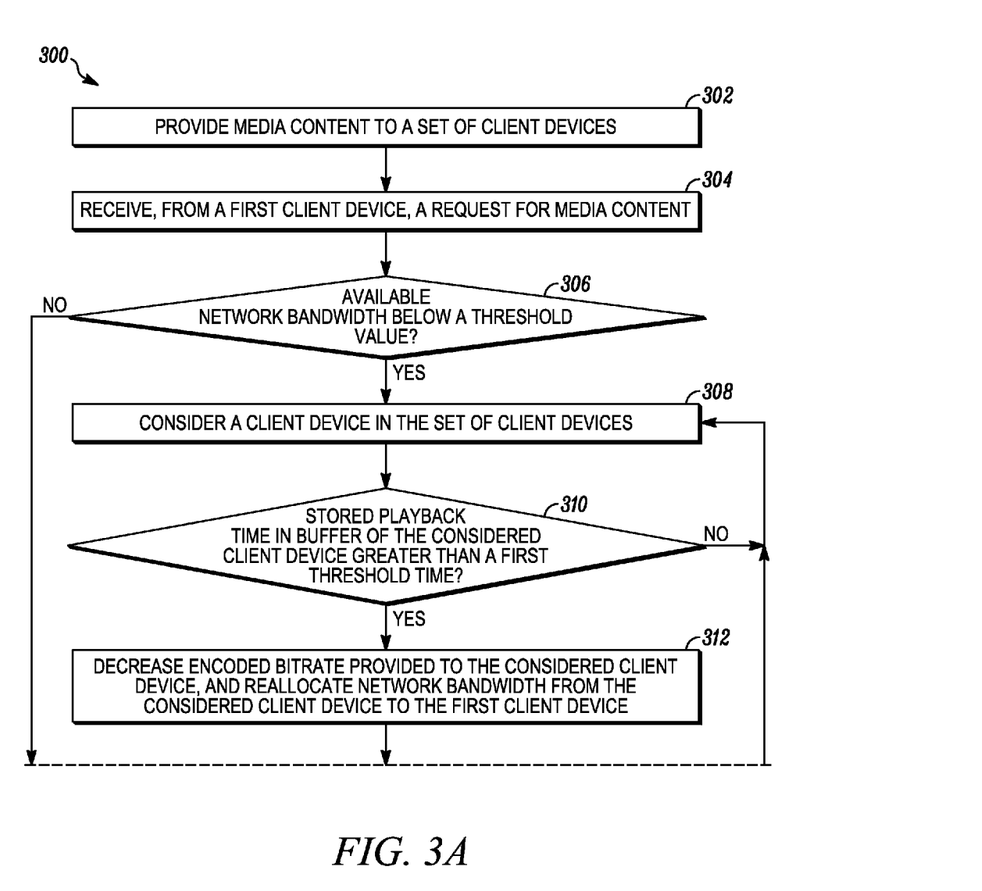
FIG. 3A and FIG. 3B together form a logical flowchart illustrating a method for streaming multimedia content in accordance with some embodiments of the present teachings.
Figure 3B:
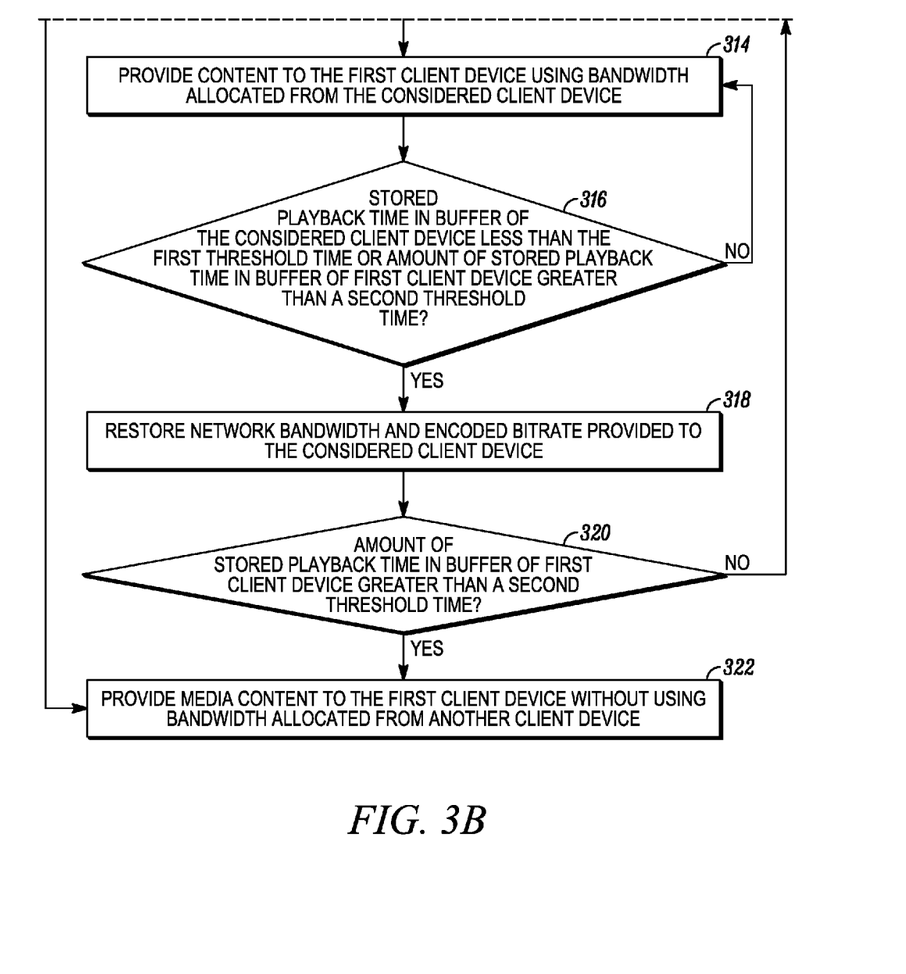
Figure 4:
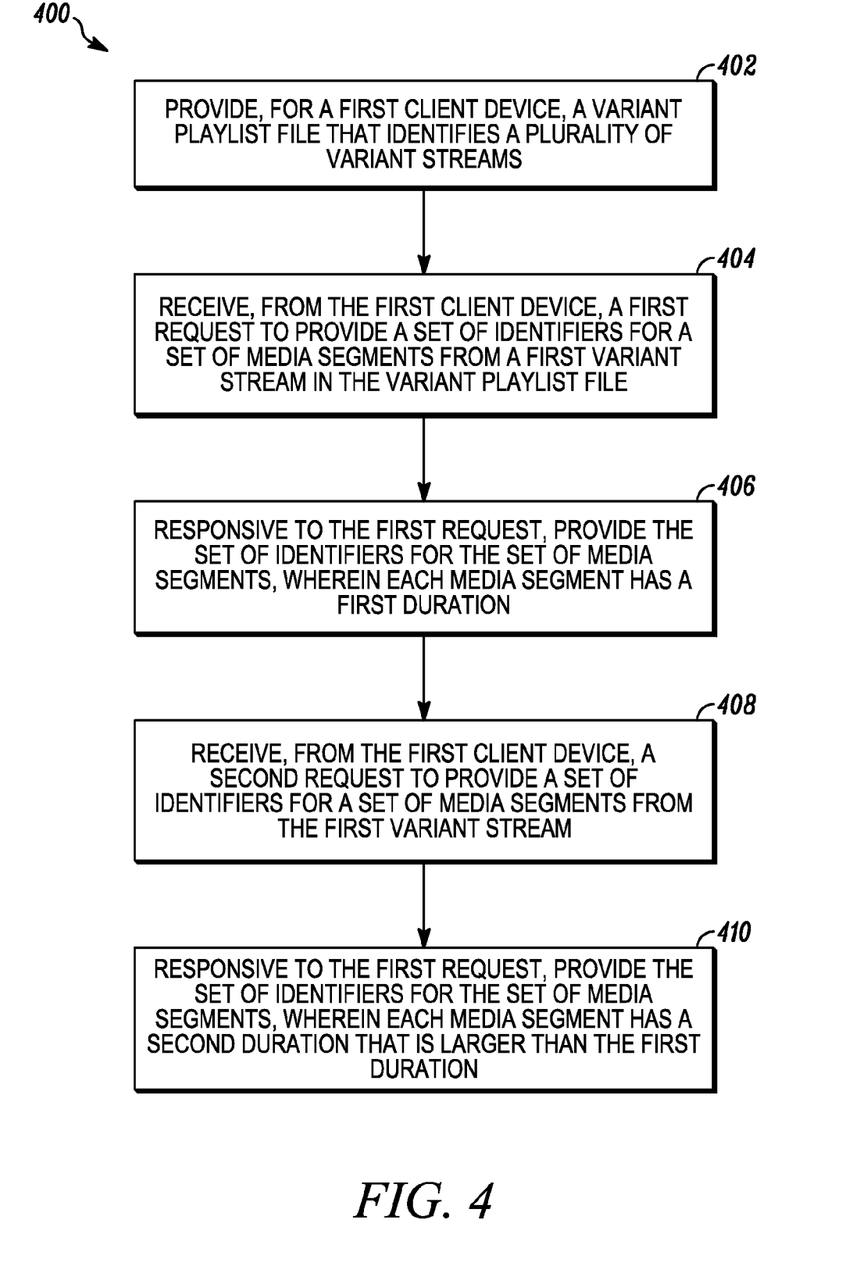
FIG. 4 is a logical flowchart illustrating a method for streaming multimedia content in accordance with some embodiments of the present teachings.

We turn now to a detailed description of the functionality of the system 100 elements in accordance with the teachings herein and by reference to the remaining figures. FIGS. 2-4 are logical flowcharts illustrating how the individual elements of system 100 operate together to perform a method for streaming media content to one or more of the client devices shown at 130-134. FIG. 2 in particular, shows how the HLS server 104 performs a method 200 that facilitates bitrate substitutions to reduce the start-up delay for a client device. At 202, the HLS server 104 provides a variant playlist (e.g., the variant playlist 120) file for a first client device (e.g., the laptop 130) that identifies a plurality of variant streams. In a particular embodiment, the HLS server 104 providing the variant playlist 120 to the first client device comprises the web server 108 publishing the variant playlist 120. The variant playlist 120 can be published specifically for a particular client device, a group of client devices, or made accessible to all client devices capable of connecting with and receiving streamed content from the HLS server 104.

Each variant stream of the plurality of variant streams identified by the variant playlist 120 corresponds to a different encoding of the same presentation. Therefore each variant stream has the same content and duration, namely the content and duration associated with the presentation. A presentation can have an open-ended (i.e., undetermined) duration, for example, where it represents a live feed associated with a television or radio station, or it can be of a known finite duration, such as in the case where the presentation represents an archived film or video clip (i.e., VOD).

In an embodiment, the variant playlist 120 identifies individual playlists, such as those shown in FIG. 1 at 122-126. For each variant stream identified in the variant playlist 120, a pointer is listed that directs a client device to a corresponding playlist which, in turn, comprises identifiers for media segments belonging to that variant stream. An identifier is a pointer, such as a URL, that specifies the location of a media segment or other file type being identified. From the variant streams identified in the variant playlist 120, a client-side selection is made for downloading a preferred encoding. This selection can be based upon user input specifying a preference, the desire for a particular screen resolution, for example, or result from programming within the client device. For purposes of this example, the first client device selects a first variant stream corresponding to a first encoded bitrate. It then uses the HTTP-enabled network 128 to communicate its selection to the HLS server 104 as an HTTP GET request. At 204, the HLS server 104 receives the first request from the first client device to provide a first set of identifiers that directs the first client device to a first set of media segments from a first variant stream of the plurality of variant streams in the variant playlist file 120, wherein the first set of media segments corresponds to a first encoded bitrate. The term "set" is defined herein as having one or more elements. For the embodiment depicted in FIG. 1, the request is received by the web server 108 located within the HLS server 104. Thereafter, information associated with the request is communicated internally to the processing element 110 and any other elements needed to process the request in accordance with the teachings herein.

Responsive to receiving the request, the HLS server 104 determines an alternate (second) set of identifiers at 206 that directs the first client device to a second set of media segments from a second variant stream from the plurality of variant streams to use in downloading a first portion of the content, wherein the second variant stream corresponds to a second encoded bitrate. Directing client devices to alternate sets of media segment files can increase the efficiency of the streaming process. One objective for doing this is to reduce the playback start-up delay for devices requesting streamed media that have just "switched on" or "changed the channel." Another is to better manage network bandwidth where multiple client devices are simultaneously accessing streamed content provided by the HLS server 104. Network bandwidth, as used herein, is the cumulative bandwidth available to the HLS server 104 for streaming media to all the client devices connected to it. Available network bandwidth refers to the portion of the network bandwidth that is free to be allocated to a particular client device. The substitution of media segment files by the HLS server 104 can be either temporary or done on a permanent basis. For example, in a particular embodiment, where the objective is to reduce start-up delay, the HLS server 104 directs the client device back to media segment files from the requested media stream when the client device has enough content buffered to begin playback. In another embodiment, where the demand for network bandwidth is high, the client device continues to receive alternate media segment files for an extended period of time.

In a particular embodiment, the HLS server 104 is a stateful server and determining the alternate set of identifiers at 206 comprises it determining and weighing at least one of the following criteria: the device type of the first client device; the buffer size of the first client device; the number of client devices connected to the server 104; or the available network bandwidth. A stateful server, as used herein, is a server that retains client data (i.e., state data) received from communicative interactions with client devices. In one embodiment the HLS server 104 interrogates connected client devices 130-134 for their hardware and/or software configuration. In another embodiment, the HLS server 104 passively receives configuration information embedded in requests sent by the client devices 130-134. This client data is cumulatively stored from one request to the next and used by the HLS server 104 in processing those requests.

By accessing client data, the HLS server 104 is aware that the first client device is of a given type. For example, the first client device could be a laptop 130 with a 15 inch screen, a cellular phone 132 with a 4 inch screen, or a tablet 134 with a 9 inch screen. Screen size is an important consideration in determining the second set of identifiers that will dictate the encoded bitrate received by the first client device. Generally, larger screen sizes require higher resolutions for clarity, whereas smaller screens are still able to provide a quality image at lower resolutions. When considering screen size together with other criteria in determining the alternate set of identifiers, the HLS server 104 might assign a weight to each factor considered that is consistent with its relative importance.

The buffer size of the first client device is an aspect of the device type, which can also be considered by the HLS server 104 in determining the alternate set of media segment files. The characteristics of the buffer can directly affect the start-up delay associated with the first client device. In a particular embodiment, for example, the first client device represents a particular brand and model requiring three seconds of playback time to be cached in its buffer before playback can begin. The HLS server 104 directs the first client device to an alternate set of media segments from a second variant stream of the plurality of variant streams in the variant playlist file 120, wherein the alternate variant stream is encoded at a second encoded bitrate that is lower than the first encoded bitrate of the first variant stream. Because media segments with a lower encoded bitrate correspond to smaller file sizes per unit of playback time as compared against media segments encoded at a higher bitrate, the first client device can download the alternate set of media segments faster than it could the set of media segment files originally requested at 204. A client device downloads a media segment by copying or transferring it from where it is held remotely (i.e., away from the client device) to where it is held locally in storage or memory possessed by the client device.

In a further embodiment, the alternate set of media segments is from a second variant stream that is not identified in the variant playlist file 120 provided to the first client device. If a playlist does not exist for the alternate set of segments, the HLS server 104 creates one "on the fly" or "dynamically" specifically for the first client device. The term "dynamically," as used herein, indicates that an action occurs in response to an event. This allows the action to be based on conditions that exist at the time of the event. The media encoder 112, stream segmenter 114, and packager 116 work together to create the needed media segment files and the newly created playlist is populated with the URLs and metadata tags for those files.

In determining the set of identifiers that point to the alternate set of media segments from the second variant stream encoded at the second bitrate, the HLS server 104, in a particular embodiment, also weighs the number of client devices to which it is connected and the amount of network bandwidth that is available to stream media content to those devices. It is expedient, for example, for the HLS server 104 to point the first client device to lower-encoded segments with smaller file sizes when a limited amount of network bandwidth must be distributed among a large number of client devices.

The HLS server 104 also provides the determined set of identifiers to the first client device at 206. This is accomplished in different ways. In one embodiment, wherein the first request comprises an HTTP GET request that includes a URL that identifies a playlist file corresponding to the first variant stream, the alternate set of identifiers comprises a set of URLs that identifies the alternate set of media segments and directs the first client device to the alternate set of media segments. For example, the HLS server 104 receives a first request from the client device with a URL that identifies a playlist containing URLs that point to the media segment files: high_01.ts, high_02.ts, and high_03.ts. In response to the request, the HLS server 104 provides the first client device with an alternate playlist containing URLs that point to the media segment files: med_01.ts, med_02.ts, and med_03.ts.

In an alternate embodiment, the second set of identifiers comprises a set of URLs that identifies the first set of media segments but directs the first client device to the second set of media segments. For example, the HLS server 104 again receives a first request from the client device with a URL that identifies a first playlist containing URLs that point to the media segment files: high_01.ts, high_02.ts, and high_03.ts. In response to the request, the HLS server 104 provides the first client device with the indicated playlist containing the URLs that identify the media segment files: high_01.ts, high_02.ts, and high_03.ts. In this case, however, the contents of "high" transport stream files are swapped out for the contents of the "med" transport stream files (i.e., the "med" files are renamed as "high" files.

At 208, the HLS server 104 receives, from the first client device subsequent to the first request, a second request to provide a third set of identifiers that directs the first client device to a third set of media segments from a third variant stream of the plurality of variant streams in the variant playlist file 120, wherein the third set of media segments corresponds to a third encoded bitrate that is higher than the first encoded bitrate. In an embodiment, the first client device is unaware that the alternate set of media segments provided by the HLS server 104 represents a second encoded bitrate which is lower than the requested first encoded bitrate. In response to a faster-than-expected download time, the first client device requests that media segments for the next portion of a streamed presentation be encoded at a bitrate that exceeds the first encoded bitrate originally requested at 204.

At 210, in response to the request at 208, the HLS server 104 provides a fourth set of identifiers that directs the first client device to a fourth set of media segments from the first variant stream, wherein the fourth set of media segments corresponds to the first encoded bitrate. When the first client device requests an increase in the encoded bitrate for the media segments being streamed to it during or shortly after the time the first set of media segments are being downloaded, the HLS server 104 responds by "stepping up" the bitrate of the media segments provided to the first client device gradually in a tiered approach. This is further illustrated in the remainder of FIG. 2.

If the first client device renews its request for media segments having the third encoded bitrate at 212, the HLS server 104 responds by providing the first client device with a set of identifiers that correspond to a set of media segments having an encoded bitarate that is between (greater than) the first and (less than) the third encoded bitrates. If the HLS server 104 receives no request from the first client device at 212, then the server 104 continues to provide the first client device with media segments corresponding to the first encoded bitrate until a request for media segments of a different bitrate is received or the presentation associated with the media segments has been streamed to the first client device in its entirety.

If, at 216, the first client device makes a repeated request for media segments having the third encoded bitrate after receiving media segments having an encoded bitrate between the first and third encoded bitrates at 214, then the HLS server 104 finally delivers a set of identifiers for a set of media segments having the third encoded bitrate at 218. If the HLS server 104 receives no request from the first client device at 216, the server 104 continues to provide media segments corresponding to the encoded bitrate specified at 214.

The following example further illustrates the HLS server 104 gradually increasing the bitrate it provides in response to repeated requests from the first client device for a higher bitrate. If, after receiving VGA-encoded (640×480 pixel) media segments, the first client device requests XGA-encoded (1024×768 pixel) media segments, the HLS server 104 responds by providing the first client device with SVGA-encoded (800×600 pixel) media segments. If the first client device, subsequent to receiving the SVGA media segments, does not request a further increase in resolution (i.e., encoded bitrate), it will continue to receive the SVGA media segments. If, on the other hand, the first client device continues to request XGA media segments, the HLS server 104 provides them.

Where the first client device's request is for an even higher resolution, such as UXGA (1600×1200 pixel), the client device is "bumped up" in multiple stages (VGA→SVGA→XGA→UXGA) if it continues to make requests for the higher resolution. When the first client device stops making requests for increased resolution, it will continue to receive the resolution provided by the HLS server 104 in response to the last request made.

In an alternate embodiment, the second request received at 208 is for a set of identifiers that directs the client device to a set of media segments that corresponds to the first encoded bitrate. Responsive to the second request, the HLS server 104 provides (210) the first client device with the set of identifiers that directs the client device to the set of media segments corresponding to the first encoded bitrate, the encoded bitrate originally sought by the first client device in the first request at 204. After providing the set of identifiers corresponding to the second encoded bitrate at 206, the HLS server 104 provides the set of identifiers corresponding to the first encoded bitrate to the first client device after one or more conditions are met. These conditions include: a first number of media segments corresponding to the second encoding being provided to the first client device, a first amount of playback time corresponding to the second encoding being provided to the first client device, a media segment with a sequence number corresponding to a value of a current media sequence tag plus an added value being provided to the first client device, and a first amount of network bandwidth becoming available for the first client device.

In an embodiment where the HLS server 104 has knowledge that playback of a streamed presentation will commence on the first client device, given its device type, when the device has downloaded either a first number of media segments or a first amount of playback time, the HLS server 104 directs the first client device to the second set of media segments until the appropriate condition is met. The first client device receives a number or an amount of media segments corresponding to a lower encoded bitrate to quickly enable it to begin playback, after which the HLS server 104 provides the client device with media segments corresponding to a higher encoded bitrate so the presentation can continue at a preferred level of quality.

Another embodiment enables the HLS server 104 to switch the first client device to a higher encoded bitrate after the first client device downloads a media segment file with a particular sequence number. The sequence number can be calculated from a media sequence tag, which is a metadata tag within a playlist that specifies the first media segment currently available in that playlist.

The HLS server 104 can also switch the first client device to a higher encoded bitrate in the event more network bandwidth becomes available for the first client device. With a sufficient increase in bandwidth, the first client device can quickly download even the larger media segments, so little is gained by continuing at the lower encoded bitrate.

FIG. 3 is a logical flowchart illustrating a method 300 for streaming multimedia content in accordance with some embodiments of the present teachings, wherein the HLS server 104 provides a first client device with network bandwidth, for downloading a portion of a presentation, corresponding to a difference in encoded bitrate between media segments requested by a second client device and media segments received by the second client device. In an embodiment, temporarily redistributing network bandwidth in this way reduces the start-up time for the first client device without causing any disruption in playback for the second client device. In another embodiment, the HLS server 104 determines a duration of buffered media retained by the second client device (i.e., its stored playback time) which corresponds to a difference between a total duration of media segments received by the second client device and an elapsed time over which the media segments were received, and when the duration of buffered media retained by the second client device exceeds a threshold value, the HLS server 104 reallocates network bandwidth from the second client device to the first client device. By configuring the processing element within the HLS server 104 to determine the amount of stored playback time in the buffer of a second client device and to reallocate network bandwidth used by the second client device to the first client device while the stored playback time is greater than a threshold time, the playback time in the buffer of the first client device may be quickly brought up to the threshold time.

While streaming media to a set of client devices at 302, the HLS server 104 receives a request for media content from the first client device at 304. At 306, the HLS server 104 determines if the network bandwidth available for the first client device to download the requested media content falls below a threshold value. The threshold value can be a static value or a dynamic value that is determined by a program based on present network conditions. If the available network bandwidth is above or equal to the threshold value, then the HLS server 104 goes on to provide the requested media content to the first client device at 322 without using bandwidth allocated from another client device. If, however, the available network bandwidth is below the threshold value, then the HLS server 104 proceeds to "borrow" network bandwidth from one or more other client devices receiving media at 302.

The process of reallocating network bandwidth begins with the HLS server 104 considering at 308 one of the client devices from the set of client devices currently downloading media as a donor of additional network bandwidth. At 310, the HLS server 104 determines if the amount of stored playback time in a buffer of the considered client device is greater than a first threshold time. In an embodiment, the first threshold time is a dynamic value determined by an algorithm run by the processing element 110 based on the current ability of the considered client device to continue playback at a reduced bandwidth. In an alternative embodiment, the first threshold time is a static value set for system 100 by an administrator or programmer. In an additional embodiment, the HLS server 104 determines the stored playback time in the buffer of a client device from the difference between the total duration of media segments sent to the client device and the time period over which the media segments were sent. If the stored playback time for the considered client device is less than or equal to the first threshold time, then the HLS server 104 repeatedly considers other client devices at 308 until one is determined to have a stored playback time that exceeds the first threshold time.

At 312, the HLS server 104 decreases the encoded bitrate of the media content being supplied to the considered client device and reallocates network bandwidth from the considered client device to the first client device. The server 104 then proceeds to provide media content to the first client device using the reallocated bandwidth, at 314. In a particular embodiment, while the considered client device is downloading media segment files of a particular encoded bitrate, the HLS server 104 "downgrades" it to media segments from a different playlist that are encoded at a lower bitrate. Decreasing (312) the network bandwidth and encoded bitrate provided to the considered client device enables it to consume less network bandwidth while maintaining uninterrupted playback as it downloads the smaller media segment files. Some portion of the freed network bandwidth, which corresponds to the drop in the encoded bitrate of the media segment files the second client device is receiving, is reallocated for use by the first client device. If additional network bandwidth is needed, the HLS server 104 can also redirect other client devices to media segments with a lower encoded bitrate. By boosting network bandwidth for the first client device, it can download its initial media segments faster and start playback sooner. The network bandwidth and encoded bitrate for the considered client device is restored (318) after a minimum number of media segments needed to start playback have been provided to the first client device.

In an example, the HLS server 104 is aware that the second client device downloaded media segment files corresponding to 60 seconds of playback time over the last 10 seconds. From this, the HLS server 104 infers that the second client device has at least 50 seconds of reserve playback time in its buffer. To provide additional bandwidth for the first client device, or other client devices, the HLS server 104 drops the network bandwidth to the second client device to the point where the second client device consumes playback time faster than it receives it. The second client device can maintain playback under these conditions by drawing on in its buffer. If 10 seconds of additional playback time is provided to the second client device over the next 30 seconds, the second client device will still have 30 seconds remaining in its buffer after that time.

At 316, the HLS server 104 determines if the stored playback time in the buffer of the considered client device is less than the first threshold time or if the amount of stored playback time in the buffer of the first client device is greater than a second threshold time. For a particular embodiment, the second threshold time is the duration of buffered content that allows playback to begin at the first client device. If neither condition is met, then the HLS server 104 continues to provide media content to the first client device using bandwidth reallocated from the considered client device. If, however, either condition is met, then the HLS server 104 restores at 318 the reallocated network bandwidth to the considered client device.

At 320, the HLS server 104 determines if the amount of stored playback time in the buffer of the first client device remains below the second threshold time. If so, then the server 104 considers other client devices at 308 from which it can "borrow" network bandwidth. Alternatively, if a sufficient amount of media is buffered at the first client device, the HLS server 104 proceeds to stream additional media content to the first client device at 322 without using network bandwidth allocated from other client devices.

In a further embodiment, the HLS server 104 intelligently redistributes, to multiple client devices, bandwidth simultaneously taken from multiple client devices. With an appropriate algorithm run by the processing element 110, the HLS server 104 "pools" bandwidth taken from a group of donor client devices. The HLS server 104 obtains bandwidth from client devices in the donor group by transitioning some of the devices to media segments with a lower encoded bitrate while borrowing bandwidth from other devices against their buffered media contents, consistent with the description above. The HLS server 104 distributes the pooled bandwidth to a group of recipient client devices to reduce start-up times, or as otherwise needed.

FIG. 4 is a logical flowchart illustrating a method 400 for streaming multimedia content in accordance with some embodiments of the present teachings, wherein a duration of each media segment from a second set of media segments provided to a first client device by the HLS server 104 is less than a duration of each media segment from a first set of media segments requested by the first client device. For a specific embodiment, the HLS server 104 receives a request from a first client device to provide a set of media segments from a first variant stream of a plurality of variant streams in a variant playlist file (e.g., the variant playlist 120), wherein the set of media segments corresponds to a first encoded bitrate, and, in response to the request, provides a set of identifiers that directs the first client device to the set of media segments from the first variant stream, wherein media segments from a first portion of the set of media segments have durations that are shorter than durations of media segments from a second portion of the set of media segments. The HLS server 104 provides the second portion of media segments to the first client device after it has provided a minimum number of media segments from the first portion of media segments needed to start playback on the first client device.

With greater particularity, the HLS server 104 provides a variant playlist 120 that identifies a plurality of variant streams to a first client device, at 402. At 404, the HLS server 104 receives a first request from the first client device to provide a set of identifiers for a first set of media segments from a first variant stream in the variant playlist 120. Responsive to the first request, the HLS server 104 provides the set of identifiers for the first set of media segments to the client device at 406, wherein each media segment in the first set has a first duration. At 408, the HLS server 104 receives a second request from the first client device to provide a set of identifiers for a second set of media segments from the first variant stream in the variant playlist 120. In response to the second request, the HLS server 104 provides the set of identifiers for the second set of media segments at 410, wherein each media segment in the second set has a second duration that is larger than the first duration.

In another embodiment, the media segments from the first set have different durations that are all less than a target duration for the first set. A target duration, defined by the HLS draft specification, is an upper limit placed on the duration of media segments the HLS server 104 provides. Similarly, media segments from the second set have durations that differ from one another but are all less than a target duration for the second set, which is less than the target duration for the first set.

The embodiments disclosed above have advantages where the first client device needs to download a first number of media segments before playback can begin. In an example where playback begins after three media segments are buffered, the first client device makes a request that includes an identifier for a first playlist that corresponds to a first variant stream encoded at a first bitrate. The HLS server 104 directs the first client device to the first playlist that contains three URLs pointing to three media segment files that have a duration of 5 seconds each. These relatively short media segments are downloaded quickly and playback commences. The HLS server 104 responds to additional requests from the first client device for additional media segment files covering the remaining portion of the streamed presentation by directing the first client device to media segments with a 15-second duration and the same encoded bitrate of the first variant stream. The 5-second media segments allow for faster start-up times while the 15-second media segments allow for more efficient encoding.

Figure 5:
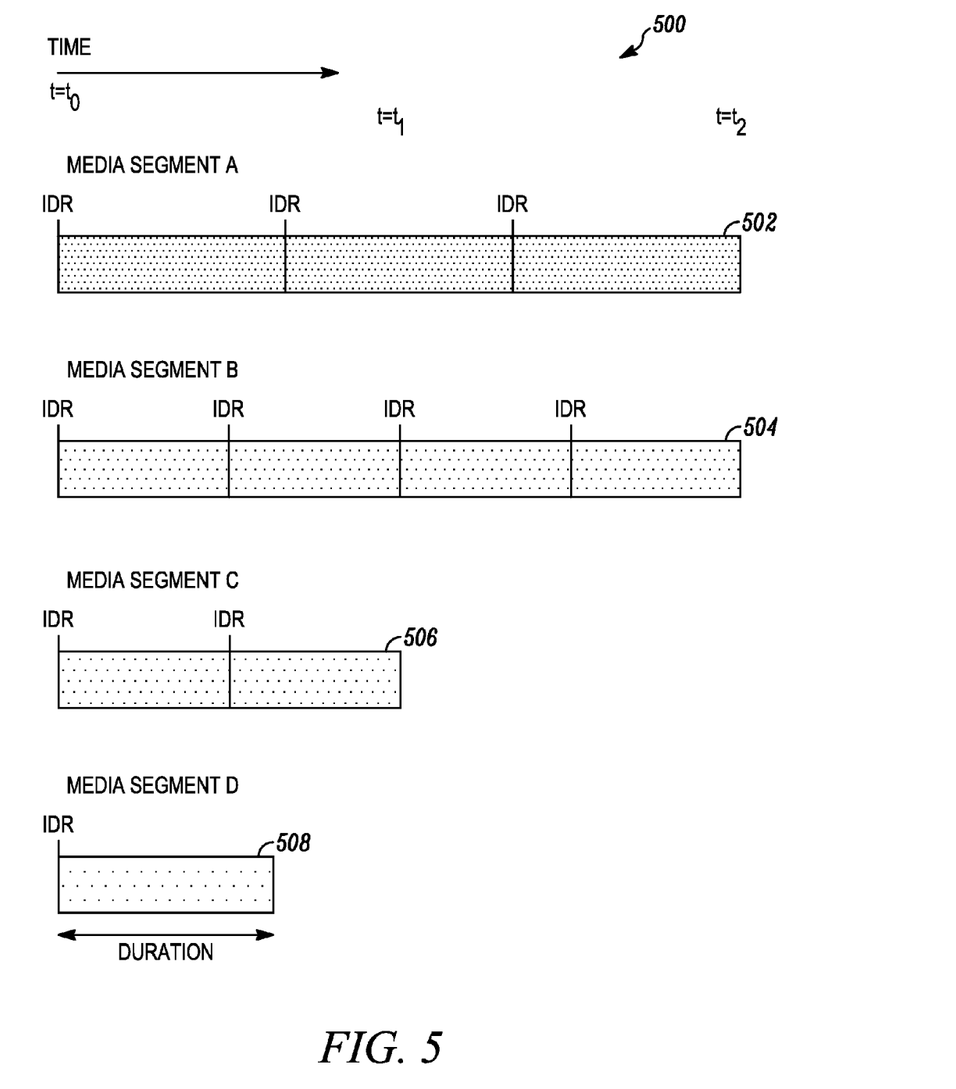
FIG. 5 is a schematic diagram of media segment files in accordance with some embodiments of the present teachings.

FIG. 5 is a schematic diagram 500 of media segment files in accordance with some embodiments of the present teachings. Media segments, which generally comprise a container, encoded video, encoded audio, and possibly an encryption protocol, represent portions of the content making up a streamed media presentation that are downloaded separately and played sequentially in the correct order. The video information within a media segment is encoded as a series of frames, with each frame representing a snapshot in time. There are two basic frame types: independent frames, which can be decoded without referencing any other frame, and dependent frames, which are decoded by referencing previous and/or successive frames. A sequence of frames that comprises an independent frame and all the frames that depend from it is defined as a group of pictures (GOP). Each GOP is self-contained in that it contains all the information to completely decode it and is, thereby, independently decodable (i.e., capable of being decoded) without referencing another GOP.

In particular, FIG. 5 shows four media segments labeled as A 502, B 504, C 506, and D 508. The illustrated length of each media segment corresponds to its duration. Media segments A 502 and B 504, for example, might have a duration of $t_2=4$ seconds, making segment C's 506 duration $t_1=2$ seconds. The density of the pixilation displayed within each media segment is proportional to its encoded bitrate. The positions of Instantaneous Decoder Refresh (IDR) frames within each media segment are indicated in time by the label "IDR." An IDR frame is a specific type of independent frame that specifies no frame after it can reference any frame before it. IDR frames are tagged so that upon receiving one, a client device can purge its decode buffer of any frames associated with a previous GOP. By placing IDR frames at the beginning of each media segment as shown, playback can proceed uninterrupted as transitions are made from one type of media segment to another.

Media segment A 502 represents a media segment file that a first client device just tuning in to a presentation might request at 204 in FIG. 2. It has a longer duration, higher encoded bitrate, and the increased spacing between the larger IDR frames indicates a more efficient use of those frames for greater encoding performance. To reduce start-up delay, the HLS server 104 provides the first client device with substitute media segments of lesser encoded bitrate and/or duration at 206. Such media segments are represented at 504-506.

Media segment B 504 is a substitute segment the HLS server 104 might provide to the first client device in place of segment A 502. In this case, the requested segment A 502 and substitute segment B 504 both have the same duration, but segment B 504 has a lower encoded bitrate. As an example, intelligence within the HLS server 104 provided by the processing element 110 might determine that segment B 504 is the best substitute for segment A 502 when there is a relatively large delay associated with passing messages between the first client device and the HLS server 104. For a first client device which is "more removed" from the HLS server 104, it takes datagrams a longer period of time to reach their destination because they are relayed over more "waypoints." The server 104 determines this transmission delay for the first client device by measuring the time interval between it sending out a datagram and it receiving an acknowledgment in return.

Dividing a portion of a media presentation into media segments of a shorter duration results in a greater number of files. This requires a greater number of requests to be passed to the HLS server 104 by the first client device. Because the transmission delay associated with multiple files is cumulative, any benefit associated with providing short-duration media segments to the first client device might be abrogated by the need to send more requests. The effectiveness of media segment B 504 as a substitute for media segment A 502 relies solely on the fact that it is encoded at a lower bitrate.

The HLS server 104 might determine that media segment C 506 is the best-suited substitute for media segment A 502 where a first client device must buffer a first number of media segments before playback can begin. Having the same encoded bitrate as media segment B 504 with half the duration, media segment C 506 can be downloaded in half the time of media segment B 504 and might reduce the start-up delay associated with media segment A 502 by a factor of 4.

Media segment D 508 represents a media segment for which the encoded bitrate is further reduced below that of media segment C 506. In one instance, for example, the frames within both media segments have the same resolution (e.g., SVGA), but media segment D 508 is encoded for fewer frames per second (e.g., 30 fps vs. 60 fps). This has the additional advantage of being able to further separate the larger-sized IDR frames in time for a given number of frames in a GOP.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
providing, by a computer server comprising a processor coupled to a memory, to a first client device of a plurality of client devices, a playlist file that identifies a plurality of variant streams corresponding to different respective encodings of a presentation of a same media content having a same duration;
receiving, by the computer server, from the first client device, a first request to provide a first set of identifiers that identifies a first set of media segments from a first variant stream of the plurality of variant streams in the playlist file, wherein the first set of media segments corresponds to a first encoding of the presentation;
responsive to the first request, providing, by the computer server, a second set of identifiers that identifies a second set of media segments from a second variant stream that is not identified in the playlist file, wherein the second set of media segments corresponds to a second encoding of the presentation, wherein the first client device is configured to use the second set of media segments in downloading a first portion of the media content of the presentation; and responsive to the second set of media segments not identified in the playlist file:
  identifying, by the computer server, current state of the first client device based on at least one of a plurality of criteria describing various aspects of the first client device;
  dynamically creating, by the computer server, a playlist comprising the second set of media segments based on the current state of the first client device;
  populating, by the computer server, the created playlist with corresponding uniform resource locators and metadata associated with each of the second set of media segments; and
  providing, by the computer server, the dynamically created playlist to the first client device.

2. The method of claim 1, further comprising encoding the first variant stream at a first encoded bitrate and encoding the second variant stream at a second encoded bitrate that is lower than the first encoded bitrate.

3. The method of claim 2, further comprising reallocating, to a second client device, network bandwidth to the second client device for downloading a portion of the presentation, wherein amount of the reallocated network bandwidth to the second client device corresponds to a difference between the first encoded bitrate and the second encoded bitrate.

4. The method of claim 1, further comprising:
  determining a duration of buffered media retained by the first client device corresponding to a difference between a total duration of media segments received by the first client device and an elapsed time over which the media segments were received by the first client device; and
  based on a determination that the duration of buffered media retained by the first client device exceeds a defined threshold value, reallocating network bandwidth from the first client device to a second client device.

5. The method of claim 1, wherein a first duration of each media segment from the second set of media segments is less than a second duration of each media segment from the first set of media segments.

6. The method of claim 1, wherein the first request comprises a hypertext-transfer-protocol request that includes a uniform resource locator that identifies a playlist file comprising the first variant stream.

7. The method of claim 1, wherein the second set of identifiers comprises a set of uniform resource locators that identifies the first set of media segments but directs the first client device to the second set of media segments.

8. The method of claim 1, further comprising:
  receiving, from the first client device subsequent to the first request, a second request to provide a third set of identifiers that identifies a third set of media segments from the first variant stream, wherein the third set of media segments corresponds to the first encoded bitrate; and
  responsive to the receiving the second request, providing the third set of identifiers that identifies the third set of media segments for the first client device to use in downloading a second portion of the content.

9. The method of claim 8, wherein the third set of identifiers is provided in response to at least one of:
  a first number of media segments corresponding to the second encoding have been provided to the first client device;
  a first amount of playback time corresponding to the second encoding has been provided to the first client device;
  a media segment with a sequence number corresponding to a value of a current media sequence tag plus an added value has been provided to the first client device; and
  a first amount of network bandwidth becomes available for the first client device.

10. The method of claim 1, further comprising:
  receiving, from the first client device subsequent to the first request, a second request to provide a third set of identifiers that identifies a third set of media segments from a second variant stream of the plurality of variant streams in the playlist file, wherein the third set of media segments corresponds to a second encoded bitrate that is higher than a first encoded bitrate used for the first encoding of the presentation; and
  responsive to the second request, providing a fourth set of identifiers that identifies a fourth set of media segments from the first variant stream, wherein the fourth set of media segments corresponds to the first encoded bitrate.

11. The method of claim 1, wherein the plurality of criteria describing various aspects of the first client device comprise at least one of:
  device type of the first client device;
  buffer size of the first client device;
  number of client devices connected to the server including the first client device; and
  available network bandwidth for the first client device.

12. An apparatus comprising:
  a computer server comprising a processor coupled to a memory, and the processor configured to:
    generate a plurality of variant streams from a media stream, wherein the plurality of variant streams correspond to different respective encoded bitrates of a presentation of the media stream of a same content having a same duration;
    provide a playlist that identifies a subset of the plurality of variant streams to a first client device;
    receive, from the first client device, a first request for a first set of identifiers that identifies a first set of media segments from a first variant stream of the subset of the plurality of variant streams, wherein the first set of media segments corresponds to a first encoding of the presenting encoded in a first encoded bitrate;
    determine, in response to the first request, a second set of identifiers that identifies a second set of media segments from a second variant stream from the plurality of variant streams, wherein the second variant stream corresponds to a second encoding of the presentation encoded in a second encoded bitrate that is lower than the first encoded bitrate, wherein the first client device is configured to use the second set of media segments in downloading a first portion of the media content of the presentation; and
    responsive to the second set of media segments not identified in the playlist file:

identify current state of the first client device based on at least one of a plurality of criteria describing various aspects of the first client device;

dynamically create a playlist comprising the second set of media segments based on the current state of the first client device;

populate the created playlist with corresponding uniform resource locators and metadata associated with each of the second set of media segments; and provide the dynamically created playlist to the first client device.

13. The apparatus of claim 12, wherein the server is further configured to determine an amount of stored playback time in a buffer of a second client device and to reallocate network bandwidth used by the second client device to the first client device while the stored playback time is greater than a defined threshold time.

14. A non-transitory computer-readable storage medium storing computer program instructions when executed by a computer processor cause the computer processor to perform steps of:

providing, to a first client device, a playlist file that identifies a plurality of variant streams corresponding to different respective encoded bitrates of a presentation of a media stream of a same content having a same duration;

receiving, from the first client device, a first request to provide a first set of identifiers that identifies a first set of media segments from a first variant stream of the plurality of variant streams in the playlist file, wherein the first set of media segments corresponds to a first encoding of the presentation encoded in a first encoded bitrate;

responsive to the first request, providing a second set of identifiers that d identifies a second set of media segments from a second variant stream of the plurality of variant streams in the playlist file, wherein the second set of media segments corresponds to a second encoding of the presentation encoded in a second encoded bitrate that is lower than the first encoded bitrate, wherein the first client device is configured to use the second set of media segments in downloading a first portion of the media content of the presentation; and responsive to the second set of media segments not identified in the playlist file:

identifying, by the computer server, current state of the first client device based on at least one of a plurality of criteria describing various aspects of the first client device;

dynamically creating, by the computer server, a playlist comprising the second set of media segments based on the current state of the first client device;

populating, by the computer server, the created playlist with corresponding uniform resource locators and metadata associated with each of the second set of media segments; and providing, by the computer server, the dynamically created playlist to the first client device.

15. The non-transitory computer-readable storage medium of claim 14, further comprising computer program instructions for:

receiving, from the first client device subsequent to the first request, a second request to provide a third set of identifiers that identifies a third set of media segments from the first variant stream, wherein the third set of media segments corresponds to the first encoded bitrate; and responsive to the receiving the second request, providing the third set of identifiers that directs the first client device to the third set of media segments to use in downloading a second portion of the content.

* * * * *